United States Patent
Wee et al.

(10) Patent No.: US 9,772,206 B2
(45) Date of Patent: Sep. 26, 2017

(54) APPARATUS AND METHOD FOR ACCURATELY MEASURING FLOW OF A MULTI-COMPONENT MIXTURE HAVING SCALE BUILDUP

(71) Applicant: Multi Phase Meters AS, Stavanger (NO)

(72) Inventors: Arnstein Wee, Randaberg (NO); Kenneth Gundersen, Bryne (NO)

(73) Assignee: FMC KONGSBERG SUBSEA AS, Kongsberg (NO)

( * ) Notice: Subject to any disclaimer, the term of this patent is extended or adjusted under 35 U.S.C. 154(b) by 24 days.

(21) Appl. No.: 14/646,691

(22) PCT Filed: Nov. 21, 2013

(86) PCT No.: PCT/NO2013/050205
§ 371 (c)(1),
(2) Date: May 21, 2015

(87) PCT Pub. No.: WO2014/081315
PCT Pub. Date: May 30, 2014

(65) Prior Publication Data
US 2015/0316402 A1    Nov. 5, 2015

(30) Foreign Application Priority Data
Nov. 21, 2012    (NO) .................................. 20121398

(51) Int. Cl.
*G01F 1/36* (2006.01)
*G01F 3/30* (2006.01)
(Continued)

(52) U.S. Cl.
CPC ................ *G01F 1/363* (2013.01); *G01F 1/44* (2013.01); *G01F 1/50* (2013.01); *G01F 1/74* (2013.01); *G01F 3/30* (2013.01)

(58) Field of Classification Search
None
See application file for complete search history.

(56) References Cited

U.S. PATENT DOCUMENTS

2008/0163692 A1*   7/2008   Huang .................... G01F 1/663
                                                                73/627
2008/0163700 A1    7/2008   Huang
(Continued)

FOREIGN PATENT DOCUMENTS

WO    WO 98/10249        3/1998
WO    WO 2007/129897 A1  11/2007
(Continued)

OTHER PUBLICATIONS

International Search Report, PCT/NO2013/050205, 4 pages, date of mailing Jun. 10, 2014.

*Primary Examiner* — Harshad R Patel
(74) *Attorney, Agent, or Firm* — Nixon Peabody LLP

(57) ABSTRACT

A method and apparatus for determining the flow rates of a multi-component fluid mixture is disclosed. The temperature and pressure of the multi-component mixture is determined. The fractions of the multi-component mixture are determined based on at least two measured physical properties of the mixture and knowledge of the same physical property of the individual components. The velocity of the multi component mixture is determined. The flow rate of the individual component of the fluid is determined. An electromagnetic measurement is performed. A statistical parameter related to the electromagnetic measurement is calculated and compared to an empirical derived threshold value corresponding to the value of the statistical parameter when only one of the components of the multi component mixture is present. The thickness of unwanted deposits on the pipe wall is deter- (Continued)

Figure 1:
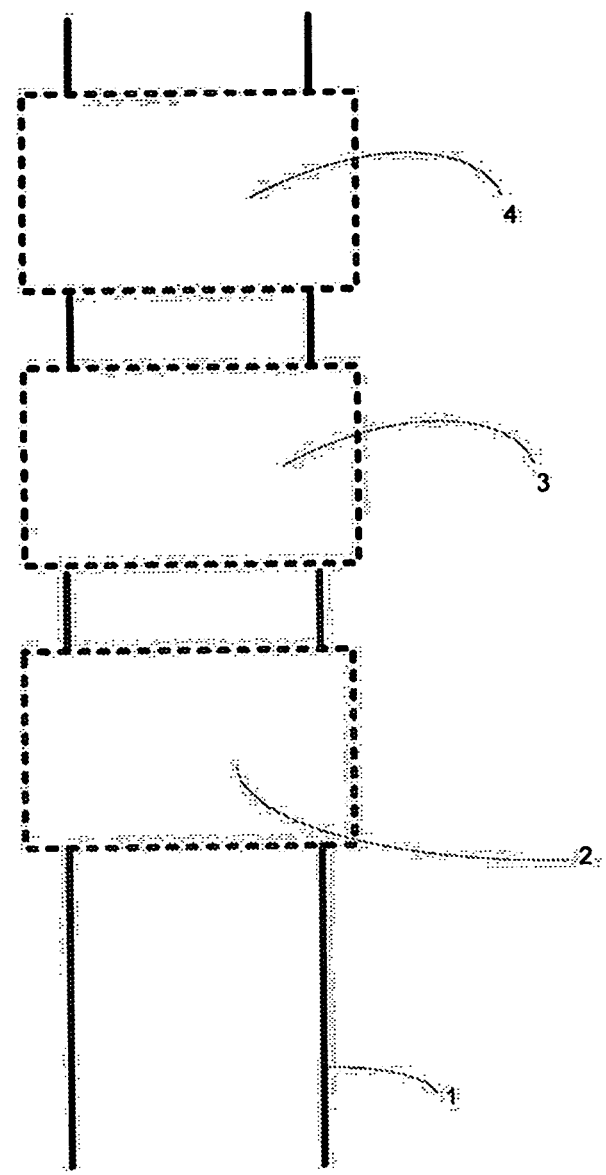

mined and an improved flow rate determination of the individual components of the fluid is obtained.

20 Claims, 7 Drawing Sheets

(51) Int. Cl.
*G01F 1/50* (2006.01)
*G01F 1/44* (2006.01)
*G01F 1/74* (2006.01)

(56) References Cited

U.S. PATENT DOCUMENTS

2011/0301877 A1* 12/2011 Wee .................. G01F 1/363
702/47
2013/0033272 A1* 2/2013 Folgeroe ................ G01N 33/28
324/637

FOREIGN PATENT DOCUMENTS

WO WO 2010/068118 A1 6/2010
WO WO 2011/133046 A1 10/2011

* cited by examiner

APPARATUS AND METHOD FOR ACCURATELY MEASURING FLOW OF A MULTI-COMPONENT MIXTURE HAVING SCALE BUILDUP

CROSS-REFERENCE TO RELATED APPLICATIONS

This application is an U.S. national stage of PCT/NO2013/050205, filed on Nov. 21, 2013, which claims priority to Norwegian Patent Application No. 20121398, filed on Nov. 21, 2012, the contents of which are each incorporated herein by reference in its entirety.

The present invention relates to a method and apparatus for measurement of the individual components of multi-phase fluid with presence of un-wanted deposits on the pipe wall, such as scale or wax. By using the method and apparatus of the present invention, it is possible to detect and determine the thickness of the un-wanted deposits on the wall of a multiphase measurement system and use this information to obtain an improved measurement of the flow rates of the individual component of the multiphase mixture.

The problem of how to meter oil-water-gas mixtures has been of interest to the petroleum industry since the early 1980s. Since then considerable research has been conducted into the development of a three-phase flow meter suitable for use in an industrial environment.

Multiphase flow in the oil & gas industry is commonly defined as a mixture of liquids and gas. The amount of free gas, also denoted GVF, is typical in the range 10-99% of the volume of the pipe. For GVFs in the range 95%-99.99%, the multiphase flow is often referred to as a wet gas where the liquid part is water and condensate (light oil). A wet gas meter is thus a multiphase meter tailored for multiphase flows with GVFs in the range 95-99.99%.

There are several techniques and known instruments for measuring multiphase flow, as will be further described below. Such instruments need to be reasonably accurate (typically better than ±5% of rate for each phase), non-intrusive, reliable, flow regime independent and provide accurate measurements over the full component fraction range. In addition to stringent measurement requirements, the instrument needs to perform reliable in a harsh and corrosive environment such as several thousand meters below the sea surface. Inside the pipe, the flowing multi-phase fluid may be traveling at a speed of 1-50 m/s with pressures in excess of 1000 bars and temperatures above 200° C. Sand is often also present and can damage the interior of the instrument.

In order to optimize the production and life of an oil/gas field, operators need to be able to regularly monitor the output of each well in the field. The conventional way of doing this is to use a test separator. Test separators are expensive, occupy valuable space on a production platform, and require a long time to monitor each well because of the stabilized flow conditions required. In addition, test separators are only moderately accurate (typically ±5 to 10% of each phase flow rate) and cannot be used for continuous well monitoring. A multiphase flow meter could be used in the first instance instead of a test separator and in the long term as a permanent installation on each well. Such an arrangement would save the loss in production normally associated with well testing. Such loss is estimated to be approximately 2% for a typical offshore installation. Allocation metering is needed when a common pipeline is used to transport the output from a number of wells owned by different companies to a processing facility. This is currently achieved by passing the output of each well through a test separator before entering the common pipeline. However, in addition to the disadvantages of the test separator described above, dedicated test pipelines to each well are also required. A permanently installed multiphase flow meter would offer significant advantages for allocation metering.

Scale is the general term for build-up of incrustations on the pipe wall, which sediment from the liquids in the pipe. Either the scale forms out of the minerals solved in the crude oil or out of the water which is produced from the well. For oil reservoirs where sea-water is injected into the reservoir to drain the oil, the water chemistry of the produced can change fairly quickly as the injected water is swept through the reservoir and mixed with the water in the reservoir causing ideal conditions for scale build up on the pipe walls. Scale build-up at the inner surface of the pipe and thus gradually decreases the cross section of the pipe. An instrument for measuring multiphase flow under such conditions needs to be able to provide reliable measurements of the oil, water and gas flow rate in the presence of scale on the pipe walls of the instrument.

A typical commercial instrument for measurement of multiphase flow measures the individual volume or mass fractions of the flow and the velocity of the individual fractions. Since the pipe diameter is known, the flow rate of the individual components can then easily be calculated.

In order to determine the individual fractions of a multi-component mixture of three components such as gas, water and crude oil, it is sufficient to perform measurement of two independent physical properties related to the components of the mixture since the sum of the fractions is occupying 100% of the pipe cross section, and can be used as the third equation.

Examples of combinations suited for measurement of fractions of a multiphase mixture are permittivity measurement in combination with density measurement, conductivity measurement in combination with density measurement or two mass absorption measurements at two different energy levels. In order to calculate the fractions of the components, the corresponding physical properties for each of the components needs to be known. E.g., when permittivity and density measurement are used to measure the permittivity and density of a multiphase mixture containing gas, water and oil, the permittivity and density of the gas, water and oil needs to be known in order to calculate the volume fractions of gas, water and oil in the pipe. If there is scale build up on the pipe wall, the fraction measurement will contain errors. Since the cross section of the pipe is reduced by the scale, the remaining pipe area for the multiphase fluid of gas, water and oil will occupy a an area of the pipe cross section which is less than 100%, hence the above mentioned third equations based on the assumption that the fractions of oil, water and gas equals 100% is invalid and the calculation of oil, water and gas fractions will thus be wrong.

In order to obtain the flow rate of the individual components of the multiphase mixture, the velocity (flow rate) must also be measured. The most common way to measure the velocity of a multiphase mixture is to measure the differential pressure using a Venturi, V-cone, Dall-tube or Orifice plate, use a positive displacement meter or to measure the velocity by cross correlating two simultaneous measurements (e.g. density, permittivity, pressure) located at different location in the pipe. Velocity measurements based on differential pressure drop or cross correlation techniques are well known and are as an example described in the Handbook of Multiphase Flow Metering (2005) issued by the Norwegian Society for Oil and Gas Measurement (NFOGM). For both differential pressure based and cross-correlation based flow meters, the inner pipe diameter is used in the calculation of the flow rates. Since scale reduces the inner diameter of the pipe, the calculated flow rate will contain errors when scale is present on the pipe wall. The combined error from the fraction measurement and velocity measurement due to scale build up on the pipe wall can be significant.

Some examples of commercially available non-intrusive multiphase meters are shown in NO 304333, U.S. Pat. No. 5,103,181, U.S. Pat. No. 6,097,786, U.S. Pat. No. 5,135,684 and WO 2007/129897. However, all these devises are subject to the same limitation as described above since they are not able to detect and determine the thickness of un-wanted deposits on the pipe wall. Under these conditions, the multiphase flow rate measurements will be unreliable and contain large measurement errors.

Devices for measuring the flow rates of a multiphase fluid are well known. Such devices may be based on cross correlation of a measurement signal detecting variations in liquid and gas droplets of the flow. By transmitting a carrier signal into the flow and measuring the response, the received signal contain information of the variations in the flow caused by amplitude (loss), phase or frequency modulation by the disturbances. By performing the measurements at two sections of the pipe located at a known distance from each other, one can create two time varying signals that are shifted in time equal to the time it takes the multiphase flow to travel between the two sections. Example of such devices based on an electromagnetic carrier signal are disclosed in U.S. Pat. No. 4,402,230, U.S. Pat. No. 4,459,858, U.S. Pat. No. 4,201,083, U.S. Pat. No. 4,976,154, WO94/17373, U.S. Pat. No. 6,009,760 and U.S. Pat. No. 5,701,083. However, all these devises are subject to the same limitation as described above since they are not able to detect and determine the thickness of un-wanted deposits on the pipe wall.

Other devises for measurement of flow rates may be based on measurement of differential pressures across a restriction in the pipe such as a venturi, orifice, v-cone or flow mixer. Examples of such devices can be found in U.S. Pat. No. 4,638,672, U.S. Pat. No. 4,974,452, U.S. Pat. No. 6,332,111, U.S. Pat. No. 6,335,959, U.S. Pat. No. 6,378,380, U.S. Pat. No. 6,755,086, U.S. Pat. No. 6,898,986, U.S. Pat. No. 6,993,979, U.S. Pat. No. 5,135,684, WO 00/45133 and WO03/034051 Similarly, all these devises are subject to the same limitation as described above since they are not able to detect and determine the thickness of un-wanted deposits on the pipe wall.

WO 2010/068118 A1 regards a method for achieving an improved flow rate for a multi-phase meter when the properties of the individual components of the multi-phase flow is not known, or have errors. Based on the improved flow rates which are described in WO 2010/068118 A1 one tries to avoid scale and deposits from forming on the pipe wall by then being able to inject chemicals into the pipe that hinders deposits from forming.

This differs from the purpose of the present invention which is to detect and decide the thickness of the scale and deposits which is already on a pipe wall and by doing that improving the flow rate after scale and deposits has formed on the pipe wall.

WO 98/10249 A1 describes a way of detecting and deciding the presence of scale and deposits on a pipe wall. The method is an indirect way of deciding the deposits on the pipe wall which is done while there is a multi-phase flow in the pipe. The method is based on a complex mechanical structure placed inside the pipe, where there are preformed three pressure measurements over the mechanical structure, this method has several weaknesses.

This method is based on using a complex mechanical structure inside the pipe measuring the pressure at three different positions. The pressure at the three different positions is a function of the components of the multi-phase mixture inside the pipe, the speed of the components and the thickness of the alleged deposits and scale inside the pipe. This method is based on an indirect assessment of the scale since the scale measurements is a function of the fractions and the speeds of the multi-phase mixture inside the pipe Further this method is very vulnerable to erosion and measuring errors in the pressure sensors.

It is the purpose of this invention to overcome the above mentioned limitations of existing solutions.

It is the purpose of this invention to detect build-up of unwanted incrustations on the pipe wall of a multiphase flow meter.

It is the purpose of this invention to determine the thickness of the un-wanted deposits on the wall of a multiphase flow meter.

It is the purpose of this invention to use the obtained information regarding the un-wanted deposits on the wall of the multiphase flow meter to obtain an improved measurement of the flow rates of the individual component of the multiphase mixture.

It is the purpose of the invention to provide accurate flow rate measurement of the components of a multiphase mixture for applications where un-wanted deposits on the pipe wall, such as scale or wax, are likely to occur.

It is the purpose of this invention to reduce the maintenance cost of multiphase flow meters.

It is the purpose of this invention to expand the use of multiphase flow meters.

It is the purpose of this invention to provide little pressure drop in the pipe of the flowing multiphase fluid.

It is the purpose of this invention to provide a non-intrusive device for performing multiphase flow rate measurements.

It is the purpose of this invention to allow compact installation of a multiphase flow meter.

It is the purpose of the invention to provide a compact mechanical structure for performing the measurements.

Figure 2:
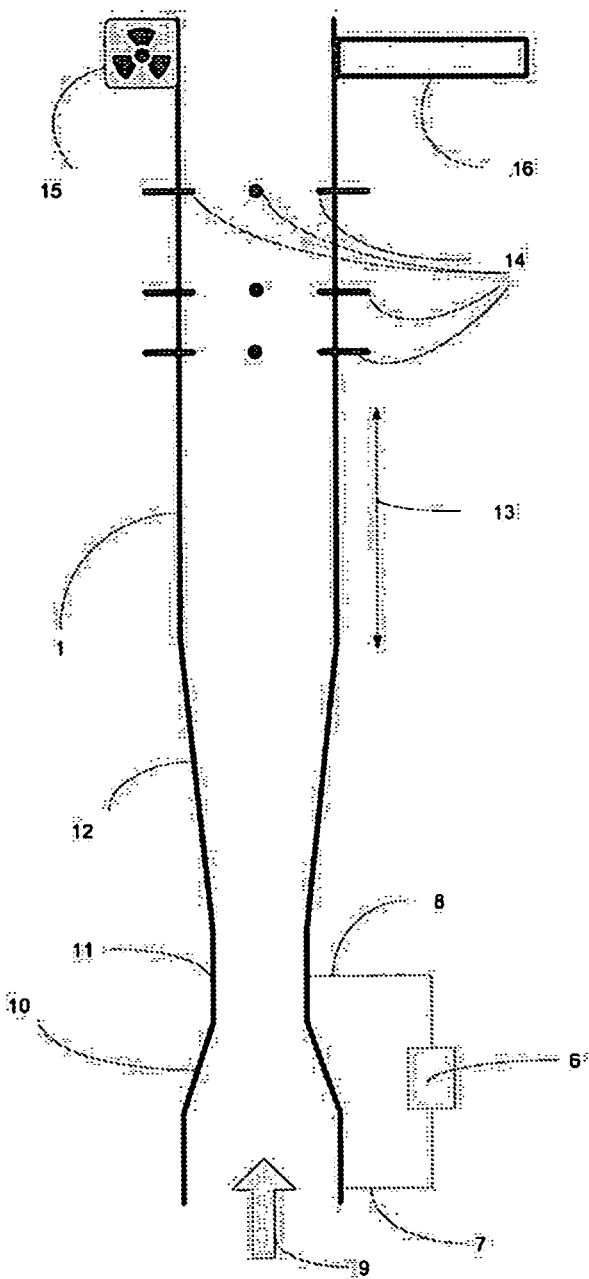
Figure 3:
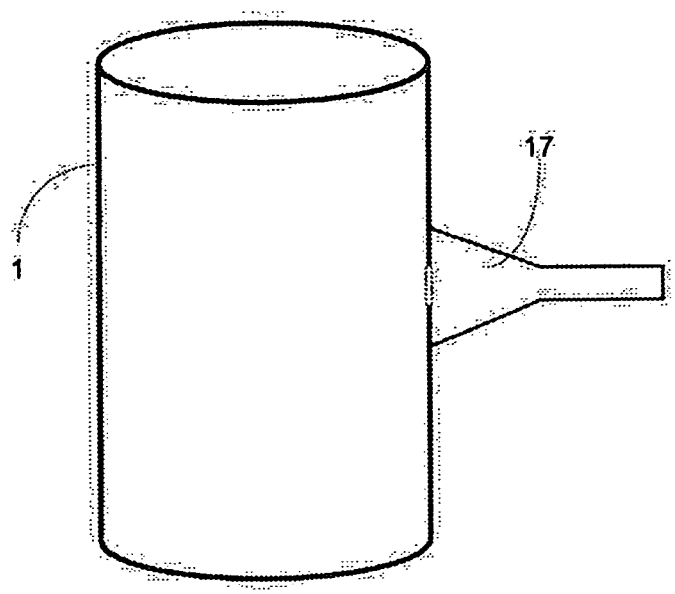
Figure 4:
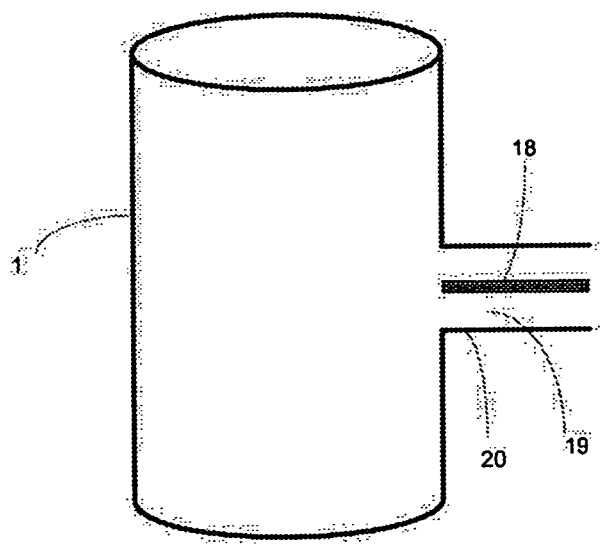
Figure 5:
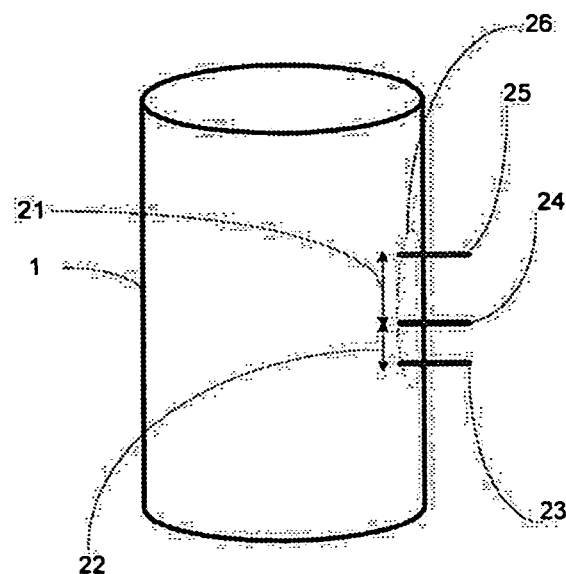
Figure 6:
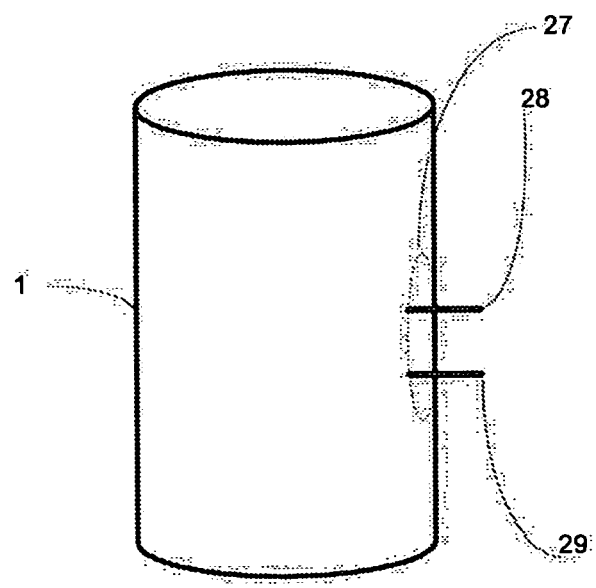
Figure 7:
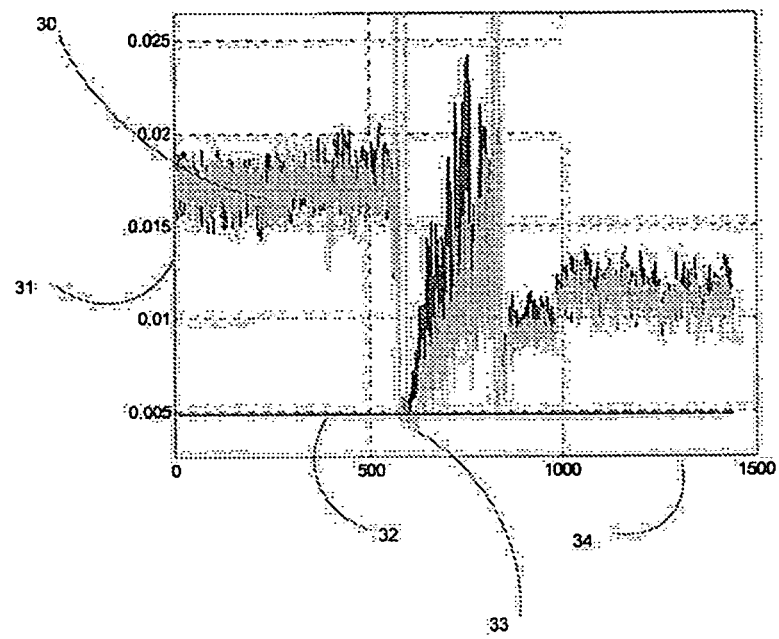
Figure 8:
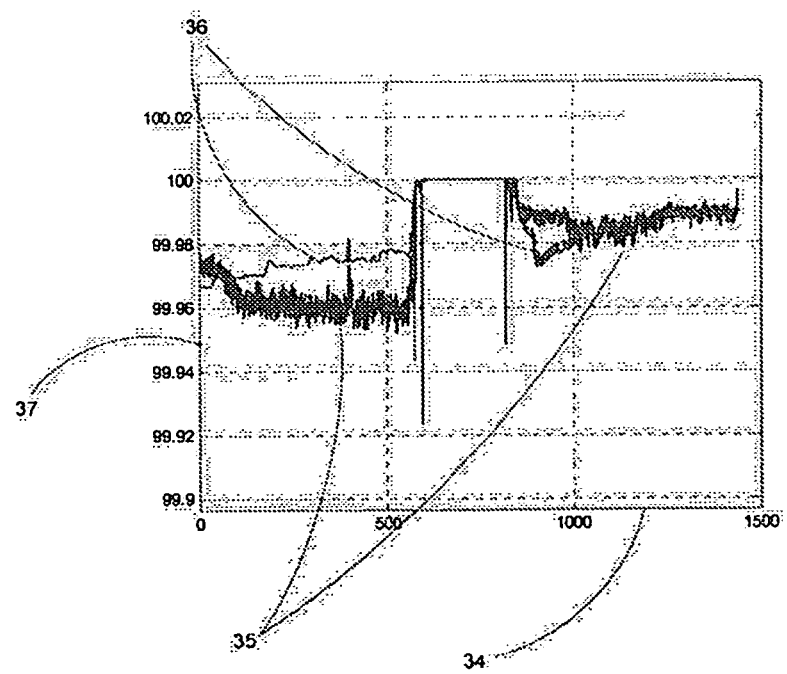
Figure 9:
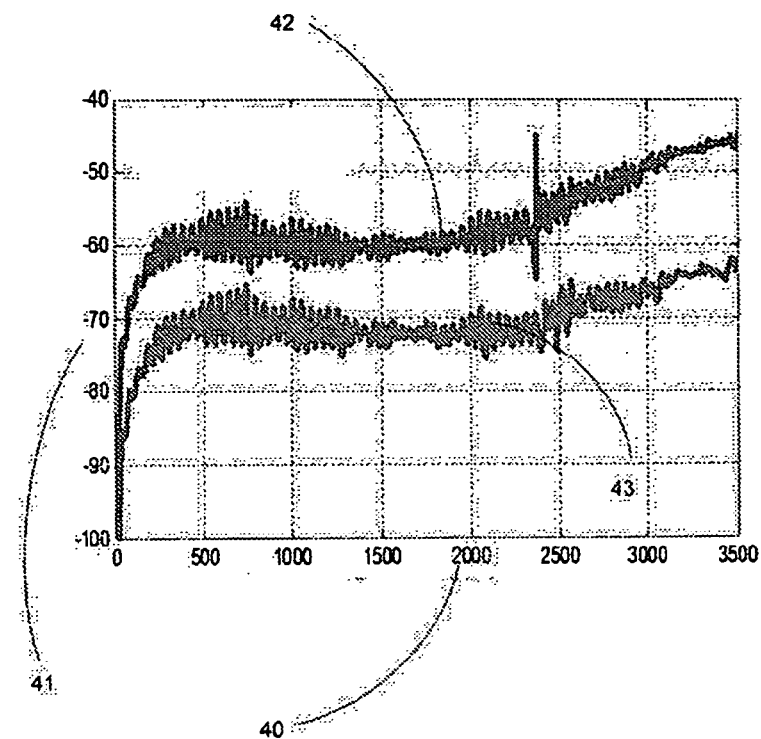
Figure 10:
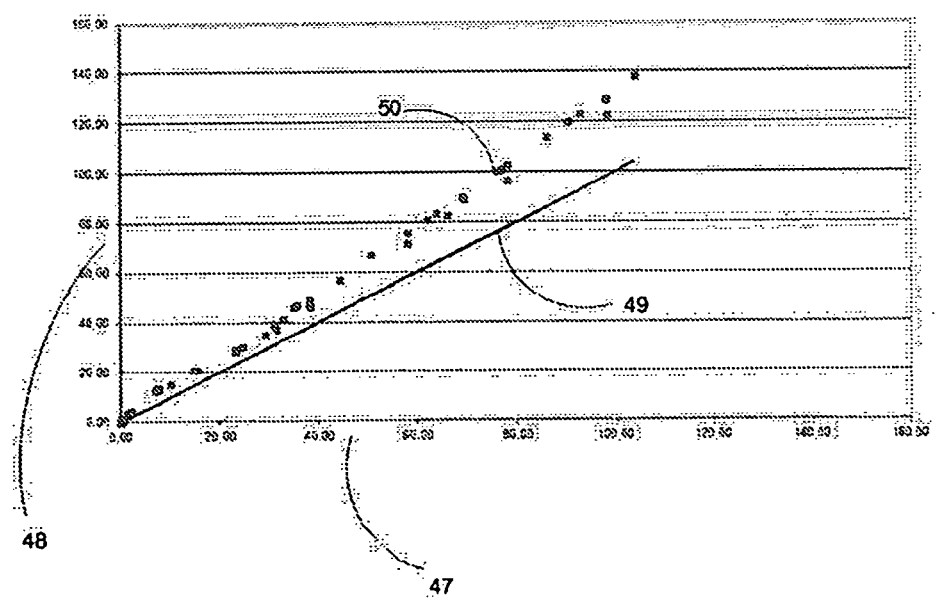
Figure 11:
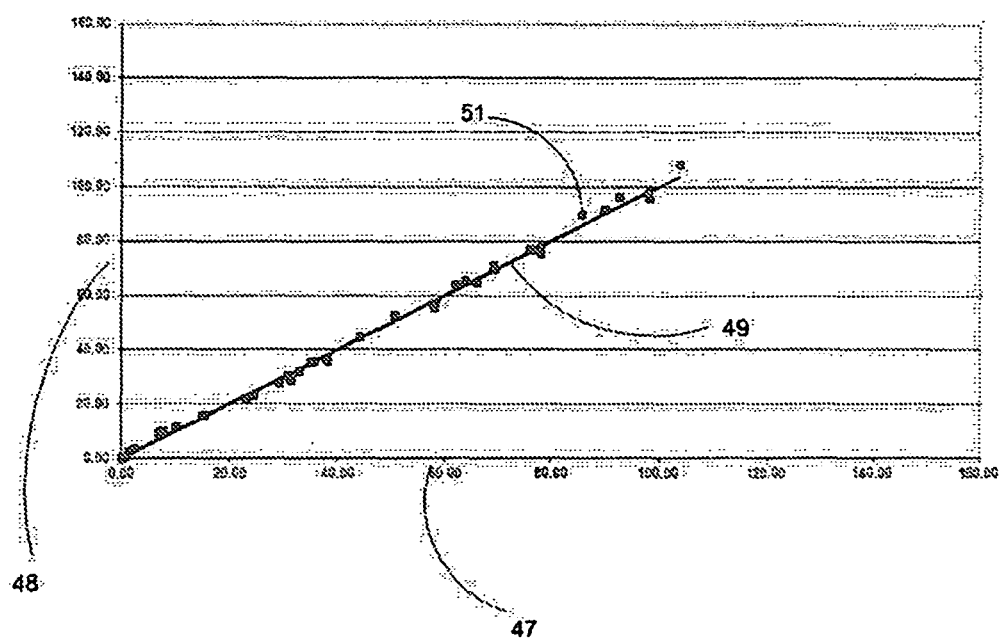

A method for determining the flow rates of a fluid comprising a multi-component mixture comprising the following steps:

a. The temperature and pressure of the multi-component mixture is determined b. the fractions of the multi-component mixture is determined based on at least two measured physical properties of the multi-components mixture and knowledge of the same physical property of the individual components of the multi-component mixture c. the velocity of the multi component mixture is determined d. based on the result from step a-c, the flow rate of the individual component of the fluid is determined.

e. an electromagnetic measurement is performed f. a statistical parameter related to the electromagnetic measurement is calculated g. the said statistical parameter is compared to an empirical derived threshold value corresponding to the value of the statistical parameter when only one of the component of the multi component mixture is present characterized by a method for improving the accuracy of the determined flow rates where h. the thickness of unwanted deposits on the pipe wall is determined i. the result from step a-d and step h is used to obtain an improved flow rate determination of the individual components of the said fluid The invention will be further described in the following with reference to the figures, where:

FIG. 1 shows a schematic longitudinal sectional view of the main elements of the invention, FIG. 2 shows a schematic longitudinal sectional view of an exemplifying embodiment of an apparatus for measuring the oil, water and gas fractions and flow rates according to the invention, FIG. 3 shows a schematic longitudinal sectional view of an exemplifying embodiment of an apparatus for performing electromagnetic measurements and determining presence and thickness of deposits on the wall according to the invention, FIG. 4 shows a schematic longitudinal sectional view of an exemplifying embodiment of an apparatus for performing electromagnetic measurements and determining presence and thickness of deposits on the wall according to the invention, FIG. 5 shows a schematic longitudinal sectional view of an exemplifying embodiment of an apparatus for performing electromagnetic measurements and determining presence and thickness of deposits on the wall according to the invention, FIG. 6 shows a schematic longitudinal sectional view of an exemplifying embodiment of an apparatus for performing electromagnetic measurements and determining presence and thickness of deposits on the wall according to the invention, FIG. 7 shows a curve relating a statistical electrical parameter to the liquid fraction within the pipe, FIG. 8 shows the measured gas fraction of a wet gas vs. a reference value as a function of time FIG. 9 shows an example of an electromagnetic measurement for a clean pipe and a pipe with scale of an exemplifying embodiment of the invention, FIG. 10 shows the measured liquid flow rate of a multiphase mixture containing 0-99% gas with a multiphase meter containing scale on the pipe wall, and FIG. 11 shows the measured liquid flow rate of a multiphase mixture containing 0-99% gas with an exemplifying embodiment of an apparatus containing scale on the pipe wall.

The present invention relates to a method and apparatus for measuring the flow rates and volume fraction of a multiphase mixture in a pipe and the thickness of any un-wanted build up of deposits on the inside of the pipe wall, such that the measured flow rates are unaffected by un-wanted build up of deposits on the pipe wall. The invention contains four elements as shown in FIG. 1. A tubular section 1, a device for measuring the velocity of the multiphase mixture 2, a device for measuring the gas, oil and water fraction of the multiphase mixture 3 and a device for detecting and measuring the thickness of the unwanted deposits on the pipe wall 4. The flow direction may be either upward or downward. The device may also be located either horizontal or any other inclination, however, vertical upward and downward flow are preferred orientations. The device also contains elements for measurement of temperature and pressure for compensation purposes; however these elements are omitted from the drawings and further description for simplicity. Some of these devices can be combined together as shown in FIG. 2 where the device for measuring the fractions of gas oil and water has been combined with the device for measuring deposits on the pipe wall.

A venturi can then be used as a flow device for measuring the velocity of the wet gas. The venturi consists of a convergent section 10 into a narrow passage 11 in a pipe 1. By measuring the upstream pressure 7 and the pressure in the narrow passage 8 by means of a pressure transmitter 6, the flow rate of the fluid(s) can be determined. The preferred flow direction is shown with an arrow 9. Other flow devices 2 based on measurement of differential pressure such as a V-cone or orifice plate and Dall Tubes may also be used. The flow device may also be based on cross correlation techniques as described in WO 2007/129897, NO 324812 and WO 2005057142. These are well known measurement principles and further information of how to use these devices can be found in *Handbook of MultiPhase Metering* issued by Norwegian Society for Oil and Gas Measurement.

The gas, oil and water fraction of the wet gas can be determined by combining the measurement from a gamma detector 16, which measures the gamma photons emitted by a gamma source 15, with electrical radio frequency measurements performed with the antennas 14. The antennas 14 is in effect coaxial conductors which is inserted into the pipe. The method for obtaining the fractions of the components of the multiphase meter using the apparatus shown in FIG. 2 is further described in NO 324812 and WO 2007/129897.

In order to accurately determine the thickness of the scale, the invention detects period where there is a known single phase fluid within the pipe. When a known single phase fluid has been detected in the tubular section, the thickness of any potential build up of deposits on the pipe wall can be determined by using a measurement device which has a well defined response related to the fluid properties of the single phase fluid and where the build up of deposits causes a well defined change in this response. For most cases, gas will be the most suited single phase fluid to detect in the tubular section since the solids on the wall will normally have a significantly different density, permittivity, conductivity, resistivity, speed of sound, etc compared to the gas. In principle, the tubular section can be filled with any single phase fluid (e.g. water, oil, methanol). However, the precision of the measurement of the thickness of the deposits on the pipe wall will be improved if there is a large contrast in fluid property between the fluid filling the pipe and the deposits on the pipe wall. In order to simplify the description of the present invention, gas is used as the single phase fluid where the wall deposit measurement is performed, but it is also obvious for a person skilled in the art that the same methods can also be used for other type of fluids such as oil, water and methanol.

The method described in WO2010/068118 can be used to detect presence of gas in the pipe. For a multiphase flow, slugging or pulsating frequently occurs such that only gas is flowing for short or longer time periods. The tubular section may also be liquid free during shut down and start up periods of the wells. Similarly, the pipe can also be oil or water filled during start up of the wells due to the natural separation of oil, water and gas which occur in the pipe and well bore when wells are shut in. Subsea production systems are frequently also designed such that the multiphase flow meters can be filled with methanol from methanol injection lines. Methanol is a common preservation fluid for subsea production system.

In order to provide reliable detection, a measurement for pure gas detection needs to work completely independent of the properties of the gas which means that a pure density, permittivity, mass absorption measurement can not be used for this purpose.

The present invention can use lack of the typical characteristics of liquid in the gas which is a time varying signal related to the natural variation in the flow due to the liquid droplets and liquid film along the wall. If pure gas is flowing in the pipe, there are no variations in the signal. An empirically derived threshold value for variation in the signal can be used to define the criteria for pure gas.

The method is further described below with references to the enclosed figures.

The electromagnetic measurement performed using the antennas 14 can be used to obtain a measurement of the variations of the flow related to flow of liquid droplets in the gas or flow of liquid film along the pipe wall. Presence of liquid in the multiphase mixture will hence cause a time varying signal which can be used to derive statistical parameters such as the standard deviation of the signal. An electrical measurement which is directly scaled towards the diameter of the pipe is preferred since the droplet diameter is also related to the pipe diameter. Electrical parameters such as the waveguide cut-off frequency of a pipe, the phase or frequency characteristic of a wave which is reflected from a diameter change in the pipe (such as the divergent section of the venturi 12), the measured phase coefficient or attenuation coefficient of a propagating electromagnetic wave within the pipe or the frequency of a resonant cavity or structure within the pipe are well suited electrical parameters. In fact, any loss or phase measurements of a propagating electromagnetic wave within the pipe or the measured loss or phase from a reflected wave from the medium in the pipe can be used. The wavelength of the measurement signal should preferable be small such that the signal is able to detect small variations caused by small liquid droplets. Most devices based on measurement of cut-off frequency, frequency of a resonant cavity in the pipe and reflection characteristics or the phase or attenuation coefficient of a propagating electromagnetic wave uses signals with small wavelengths. A typical frequency range is 100-5000 Mhz depending on the pipe diameter, however larger and smaller frequencies may also be used. Examples for how most of these electrical parameters can be obtained using the apparatus shown in FIG. 2 is further described in WO 2007/129897, NO 324812 and WO 2005057142. The resonance frequency of a resonant cavity within the pipe can also be used as the electrical signal. Example of a device suitable for this purpose can be found in WO 03/034051. This device can also be used to measure gas, oil and water fractions of the wet gas. Capacitance and inductance sensors are also widely used to measure the fractions of multi phase fluids based on measurement of permittivity and conductivity. Electrical signals obtained from capacitance and inductance sensors may also be used.

FIG. 7-8 shows a measurement based on an apparatus as shown in FIG. 2. The statistical parameter calculated from the electromagnetic measurement 30 is shown in FIG. 7 where the standard deviation of a reflected signal of an electromagnetic wave within the pipe is shown. The measurement is performed at Statoil's test facility for wet gas at Kårstø and compared towards an empirical derived threshold value 32 for pure gas. The y-axis 31 shows the standard deviation and the x-axis 34 is time in seconds. For a short of approximately 20 minutes 33, pure gas is detected in the pipe. FIG. 8 shows the measured gas fraction 35 of the multiphase meter compared to the reference gas fraction 36. The x-axis 34 is time in minutes and the y-axis 37 is the gas void fraction (GVF) in the pipe. During a period of approximately 250 minutes there is a GVF close to 100% in the pipe. From FIG. 7 it is seen that the calculated standard deviation 30 of the electrical parameter is below the gas threshold for approximately 10-20 minutes immediately after the flow rate have been shut off. During this period, the measurement of deposits on the pipe wall can be performed with high precision. After approximately 10-20 minutes, condensation of liquid starts to occur due to reduction in the temperature in the pipeline. Condensation of liquid may lead to liquid droplets or film on the pipe wall which can be miss interpreted as deposits of solids on the pipe wall. Hence, by using the above described method to detect pure gas, this problem can be avoided since the method can detect condensation of liquid from the gas.

When the pipe is filled with a known fluid, such as gas, there are several methods which can be used to detect presence of solids, such as scale, on the pipe walls. Two antennas as shown in FIG. 6 can be used to detect and measure the thickness of scale in the pipe. The antennas are coaxial conductors isolated by an insulating material from the pipe wall, and penetrating slightly into the pipe acting as a dipole antenna inside the pipe. The sending antenna 28 and receiving antenna 29 can also be made as a separate unit 27 which is assembled into the pipe or as to separate antennas. The antennas may also be located along the circumference of the pipe or axially along the pipe or in a combination of any axial and radial location. This device can be used to measure loss, phase of an electromagnetic wave within the medium of the pipe.

Based on field experience with multiphase meters, it has been found that build up of scale in a multiphase meter apparatus as shown in FIG. 2, is quite uniformly distributed over the entire length of the meter. As an example, a meter which had been exposed to a field application with scale had a uniform average layer of 2.2 mm of scale with a min/max variance of ±0.2 mm from the average value. Hence, experience has shown that the device for measurement of scale build up, as exemplified by FIG. 2, can be placed at any location along the pipe wall for a multiphase meter exemplified by FIG. 2.

FIG. 9 shows an example where the loss of a transmitted electromagnetic wave is used as electromagnetic parameter 41 for a gas filled pipe with clean pipe walls 43 and 2.2 mm of scale build up on the pipe wall 42. The loss measurement is performed over a wide frequency range 40 for an electromagnetic wave transmitted on a transmitting antenna 28 and receiving antenna 29 as shown in FIG. 6. The loss 41, is the measured loss in dBm from when the signal travels from the transmitted antenna 28 to the receiving antenna 29.

The loss 43 is virtually unaffected by the composition or pressure of the gas. However, when there are unwanted deposits on the pipe wall, such as scale, there is a clear reduction of the measured loss 42. The curve 42 shows the measured loss for a scale thickness of 2.2 mm. The average change in loss due to 2.2 mm of scale build up is approximately 15 dBm. Commercial available electronics can easily measure the loss within ±0.2 to 0.5 dBm, and hence accurate measurements of scale deposits (within ±0.2 mm) can easily be achieved with the present invention. The loss measurement can be performed at a single frequency or by using multiple frequencies, constituting a frequency sweep, as shown in FIG. 9. In general, a frequency sweep will be a more robust method to perform the measurement and will also give a higher precision. By performing a range of loss measurement for a wide range of thicknesses of scale along the wall, a mathematical model, or curve, which relates the measured loss to the thickness of the scale layer on the wall can be obtained and used to determine the thickness of the scale or deposit layer.

FIG. 10 shows the measured liquid flow rate for a multiphase meter as shown in FIG. 2 with 2.2 mm of scale deposits on the pipe wall. The test has been performed over a range of 0-100% for the oil, water and gas fraction in a multiphase test flow loop. The reference flow rate 49 is shown as a straight line whereas the measurements performed by the multiphase meter is shown as square dots 50. From FIG. 10 it is seen that 2.2 mm of scale causes an error of approximately +25% on the measured liquid flow rate of the multiphase mixture.

FIG. 11 shows the result where the present invention has been used to determine the thickness of the scale end correct the measurements performed by the multiphase meter. The measured thickness of the scale layer has been used to obtain a corrected pipe inner diameter which again are used in the equations for calculating the fraction measurement and flow rate measurement as described in WO 2007/129897 and shown in FIG. 2. From FIG. 11, it is seen that the liquid flow rate measured according to the present invention 51 agrees much better with the reference liquid flow rate 49. In general, the liquid flow rate measured with the present invention is within ±5% of the reference liquid flow rate compared to a difference of +25% for a multiphase meter known in the prior art.

The procedure for determining the properties of the gas and calculating the flow rates of the individual components of the wet gas then becomes:
1) Perform electrical measurement such as the phase coefficient or attenuation coefficient of a traveling electromagnetic wave in the pipe, pipe cut-off frequency or reflection frequency, phase or loss of a wave traveling through or reflected from the medium in the pipe. Examples for how to do this can be found in WO 2007/129897, NO 324812 and WO 2005057142.
2) Calculate a statistical parameter based on the time varying electrical measurement from step 1.
3) Compare the result from step 2 towards an empirical derived threshold value corresponding to pure gas in the pipe.
4) If the calculates statistical parameter from step 2 is below the threshold value from step 3, perform a measurement to determine thickness of any potential build up of solids on the pipe wall. Examples of an apparatus for performing this measurement is shown in FIG. 3-6.
5) Calculate the corrected pipe diameter where the measured thickness of deposits on the wall is accounted for by subtracting it from the pipe diameter of the clean pipe.
6) Calculate fraction of gas, oil and water (e.g. multiphase mixture) components using the corrected pipe diameter from step 5. Exemplifying methods and apparatuses for determining the fractions and flow rates of the multiphase mixture can be found in WO 2007/129897, NO 324812, WO 2005057142+NO 30433, WO 03/034051, WO00/45133 or U.S. Pat. No. 6,405,604
7) Calculate the velocity of fractions in the pipe based on the measured fractions from step 6 and the corrected pipe diameter from step 5. Examples for how to calculate the velocity of the fractions can be found in WO 2007/129897, NO 324812, WO 2005057142+NO 30433, WO 03/034051, WO00/45133 or U.S. Pat. No. 6,405,604

In addition to the elements described above, the measurement apparatus also contains elements for performing electrical measurements and computer for performing the calculations; however it is well known how to realize the required electronics and software to perform these measurements and calculations.

Many types of measurements can be used to determine the thickness of the deposits on the pipe wall. Transmission and reflection methods are well known method for material characterization and are well suited for measurement of deposits on the pipe wall. Examples of an apparatus based on transmission and reflection measurements are shown in FIGS. 3 and 4. Electromagnetic methods can be based on a radiating slot 17 through the wall as shown in FIG. 3 or by using an open ended coaxial conductor 18 as shown in FIG. 4. A pulse or continuous frequency is transmitted on the coaxial cable 18. Based on a measurement of the amplitude and phase variations reflected back on the coaxial conductor, the thickness of any potential layer of deposits on the pipe wall can be determined. The design and working principles of transmission and reflection sensors as shown in FIGS. 3 and 4 is further described in "*Microwave Electronics—measurement and material characterization*" by Chen et. al., Wiley (2004), and "*Permittivity Measurements of Thin Liquid Film Layers using open-ended Coaxial Probes*", Meas. Sci. Technol., 7 (1996), 1164-1173.

A similar arrangement as shown in FIG. 6 and discussed above, based on three antennas for performing electromagnetic measurements are shown in FIG. 5. The antennas are coaxial conductors isolated by an insulating material from the pipe wall and penetrating slightly into the pipe acting as a dipole antenna inside the pipe. The antennas may be made as one compact probe unit 26 as shown in FIG. 5 where the transmitting antenna 24 and the two receiving antennas 25, 23 are electrical insulated from the metal housing 26 by ceramic or glass or a similar insulating material. The device is ideally suited to measure, phase and loss of an electromagnetic wave in the pipe. By using this device, a differential phase measurement can be used to detect and measure the scale thickness.

It is also clear to a person skilled in the art that many other types of measurement techniques may be used to determine the scale thickness. As an example, the scale thickness may also be determined by using ultrasonic techniques. It is well known that an ultrasonic transmitter and receiver can be used to measure the speed of sound through the pipe. The speed of sound for a single phase fluid, such as gas, is well known. Any build-up of deposits on the pipe wall will significantly change speed of sound measurement through the pipe and can therefore be used to detect and measure the scale thickness. Other types of electrical based sensors located on the pipe wall, such as a capacitance sensors and resistance sensors can also be used to detect presence of scale and measure the scale thickness. Capacitance sensors are particularly known for being very sensitive to scale build up on the wall and are therefore suited for detection and measurement of scale build up.

The fractions and velocity of the multiphase mixture, as outlined in step 6 and 7 above, may be derived using any known measurement principle suited for measurement of the individual component fractions and component velocities of a multiphase mixture. As an example, the component fractions and velocities may mixture may be derived by using dual energy mass absorption measurements as described in U.S. Pat. No. 5,135,684 or capacitance/inductance measurement principle in combination with single energy mass absorption as described in NO 30433 or capacitance/inductance measurement principle in combination with cross correlation and venturi as shown in WO00/45133 or methods based on multiple pressure drop measurements as described in WO 02/44664 and NO 32017. Anyone of these devices can be combined with an electromagnetic measurement as described in step 2-3 above for detection of pure gas (liquid free periods) in the pipe. Example of an apparatus which can be combined with the above mentioned multi-phase flow meters for detection of pure gas is shown in FIG. 3-6, however in principle any electromagnetic measurement device capable of performing electromagnetic measurements of the variance in the liquid fraction of a multiphase mixture can be used to obtain the statistical parameter required for detection of pure gas.

The invention claimed is:

1. A method for determining the flow rates of a fluid comprising a multi-component mixture and improving the accuracy of the determined flow rates comprising the following steps:
   a. determining the temperature and pressure of the multi-component mixture via a temperature measurement device and a pressure measurement device respectively;
   b. determining the fractions of the multi-component mixture via a fraction measurement device based on at least two measured physical properties of the multi-components mixture and knowledge of the same physical property of the individual components of the multi-component mixture;
   c. determining the velocity of the multi component mixture via a velocity measurement device;
   d. based on the result from step a-c, determining the flow rate of the individual component of the fluid;
   e. performing an electromagnetic measurement via a probe unit;
   f. calculating a statistical parameter related to the electromagnetic measurement via a computer;
   g. comparing said statistical parameter to an empirical derived threshold value corresponding to the value of the statistical parameter when only one of the component of the multi component mixture is present via the computer;
   h. determining a thickness of unwanted deposits on a pipe wall of a pipe via the computer using one of the following: a) measurement of phase or loss of an electromagnetic wave transmitted through a media within the pipe, b) measurement of the phase or loss of a reflected electromagnetic wave within the pipe, c) measurement of capacitance, measurement of resistance or d) measurement of speed of sound; and
   i. obtaining an improved flow rate determination of the individual components of said fluid from the result from steps a-d and step h.

2. A method according to claim 1, wherein the physical property comprises a permittivity, density or mass adsorption coefficient.

3. A method according to claim 2, wherein the velocity is measured based on a measurement of pressure drop across a restriction in the pipe.

4. A method according to claim 1, wherein the measured physical property comprises permittivity, density, mass attenuation, or conductivity.

5. A method according to claim 4, wherein the velocity is measured based on a measurement of pressure drop across a restriction in the pipe.

6. A method according to claim 1, wherein the velocity is measured based on a measurement of pressure drop across a restriction in the pipe.

7. A method according to claim 6 wherein the pressure drop is measured using a venturi, a V-cone, a Dall tube or an orifice.

8. A method according to claim 1, wherein cross-correlation techniques are used in determining the velocity of the multi-component mixture.

9. A method according to claim 1, wherein the electromagnetic measurement in step e) is based on one of: a) measurement of the phase or loss of an electromagnetic wave transmitted through the media within the pipe, b) measurement of the phase or loss of a reflected electromagnetic wave within the pipe, c) measurement of a resonance frequency within the pipe, or d) measurement of energy loss and/or phase shift of an electromagnetic wave being reflected from the media within the pipe.

10. A method according to claim 1, wherein the statistical parameter is calculated using an electromagnetic measurement based on one of a) measurement of the phase or loss of an electromagnetic wave transmitted through the media within the pipe, b) measurement of the phase or loss of a reflected electromagnetic wave within the pipe, c) measurement of a resonance frequency within the pipe, d) measurement of a resonance frequency within the pipe, or e) measurement of energy loss and/or phase shift of an electromagnetic wave being reflected from the media within the pipe.

11. A method according to claim 1, wherein a standard deviation is used as the statistical parameter.

12. An apparatus for determining the flow rates of a fluid comprising a multi-component mixture and improving the accuracy of the determined flow rates, the apparatus comprising:
   a tubular section;
   a temperature measurement device determining the temperature and a pressure measurement device determining pressure of the multi-component mixture;
   a fraction measurement device measuring at least two physical quantities of the multi-component mixture;
   wherein the fraction measurement device calculates the fractions of the individual components of the multi-component mixture based on knowledge of the said physical properties of the individual components of the multi-component mixture;
   a velocity measurement device determining the velocity of the multi component mixture;
   a probe unit performing an electromagnetic measurement; and
   a computer operative to:
   calculate the flow rate of the individual fractions of the multi-component mixture;
   calculate a statistical parameter based on the electromagnetic measurement;
   compare the statistical parameter towards an empirical determined threshold value;
   determine the thickness of unwanted deposits on the pipe wall; and
   calculate an improved flow rate of the individual fractions of the multi-component mixture.

13. An apparatus according to claim 12, wherein the probe unit transmits electromagnetic energy into the tubular section and records received electromagnetic energy from the tubular section.

14. An apparatus according to claim 12, wherein the probe unit provides electromagnetic resonances within the tubular section.

15. An apparatus according to claim 12, wherein the probe unit measures electromagnetic loss or phase of said transmitted electromagnetic energy within the tubular section.

16. An apparatus according to claim 12, wherein the velocity measurement device measures said velocity in a narrow passage of the tubular section.

17. An apparatus according to claim 12, wherein the velocity measurement device comprises a venturi or a V-cone.

18. An apparatus according to claim 12, wherein the velocity measurement device measures said velocity by cross-correlating measurements performed in two cross-sections of the tubular section.

19. An apparatus according to claim 12, further comprising one or more devices for measurement of physical quantities of the multi-component mixture, the one or more devices comprising a combination of radioactive source and photon detector, multiple pressure drop measurements devices, a combination of a pressure drop device and cross correlation velocity device.

20. An apparatus according to claim 12, further comprising an acoustic wave sensor for transmitting acoustic signals into the tubular section and receiving acoustic signals from the tubular section, a capacitive sensor for performing capacitance measurements in the tubular section, or a resistance sensor for performing resistance measurements in the tubular section.

* * * * *